US012664634B2

(12) United States Patent
Lovings et al.

(10) Patent No.: US 12,664,634 B2
(45) Date of Patent: Jun. 23, 2026

(54) SYSTEMS AND METHODS FOR ANALYZING STRUCTURAL DAMAGE IMAGES USING MACHINE LEARNING

(71) Applicant: State Farm Mutual Automobile Insurance Company, Bloomington, IL (US)

(72) Inventors: Rick Lovings, Normal, IL (US); Jody A. Thoele, Bloomington, IL (US); Erik Skyten, Harriman, TN (US); Joann C. Yant, Bloomington, IL (US); Joshua Sutter, Bloomington, IL (US); Miguel A. Garcia-Peguero, Goodyear, AZ (US); Shawn R. Harbaugh, Normal, IL (US); Tishauna Wilson, Tampa, FL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 46 days.

(21) Appl. No.: 18/597,575

(22) Filed: Mar. 6, 2024

(65) Prior Publication Data

US 2024/0303747 A1     Sep. 12, 2024

Related U.S. Application Data

(60) Provisional application No. 63/488,578, filed on Mar. 6, 2023.

(51) Int. Cl.
*G06Q 40/00* (2023.01)
*G06Q 40/08* (2012.01)
(Continued)

(52) U.S. Cl.
CPC ........... *G06T 7/0002* (2013.01); *G06Q 40/08* (2013.01); *G06V 10/761* (2022.01);
(Continued)

(58) Field of Classification Search
CPC .............. G06T 7/0002; G06T 2200/24; G06T 2207/10032; G06T 2207/20081;
(Continued)

(56) References Cited

U.S. PATENT DOCUMENTS 10,521,865 B1 * 12/2019 Spader .................... G06Q 40/08
10,580,075 B1 * 3/2020 Brandmaier ........... G06Q 40/08
(Continued)

OTHER PUBLICATIONS

Single-view recaptured image detection based on physics-based features; 2010 IEEE International Conference on Multimedia and Expo (2010, pp. 1469-1474); Xinting Gao, Tian-Tsong Ng, Bo Qiu, Shih-Fu Chang; Jul. 19, 2010. (Year: 2010).*

*Primary Examiner* — Tien C Nguyen
(74) *Attorney, Agent, or Firm* — Armstrong Teasdale LLP

(57) ABSTRACT

A computer system may include at least one memory and at least one processor in communication with the at least one memory. The processor may be programmed to: (1) receive photographic data including one or more images of a structure; (2) in response to receiving the photographic data, apply the photographic data to a structure assessment model configured to determine a structural status of the structure, wherein the structure assessment model is trained using historical photographic data including a plurality of historical images of structures; (3) receive an output from the structure assessment model, wherein the output at least one determined characteristic of the structure; and/or (4) based upon the output, transmit a message to a user computing device associated with the structure that causes display of the determined characteristic.

19 Claims, 7 Drawing Sheets

(51) Int. Cl.
  G06T 7/00 (2017.01)
  G06V 10/74 (2022.01)

(52) U.S. Cl.
  CPC    *G06T 2200/24* (2013.01); *G06T 2207/10032*
      (2013.01); *G06T 2207/20081* (2013.01); *G06V*
                          *2201/10* (2022.01)

(58) Field of Classification Search
  CPC .. G06Q 40/08; G06V 10/761; G06V 2201/10;
              G06V 20/17; G06V 20/176
  See application file for complete search history.

(56)                References Cited

U.S. PATENT DOCUMENTS

| | | | | |
|---|---|---|---|---|
| 10,593,109 | B1 * | 3/2020 | Floyd | G06Q 40/08 |
| 10,621,675 | B1 * | 4/2020 | Genser | G06Q 40/08 |
| 11,080,838 | B1 * | 8/2021 | Li | G06T 7/0002 |
| 2005/0251427 | A1 * | 11/2005 | Dorai | G06Q 40/08 |
| | | | | 705/4 |
| 2008/0255887 | A1 * | 10/2008 | Gruter | G06Q 40/08 |
| | | | | 705/4 |
| 2009/0138290 | A1 * | 5/2009 | Holden | G06Q 40/08 |
| | | | | 705/4 |
| 2017/0193297 | A1 | 7/2017 | Michini et al. | |
| 2017/0193829 | A1 | 7/2017 | Bauer et al. | |
| 2018/0122246 | A1 | 5/2018 | Clark | |
| 2018/0336418 | A1 * | 11/2018 | Splittstoesser | G06F 18/22 |
| 2022/0084187 | A1 | 3/2022 | Wang et al. | |

* cited by examiner

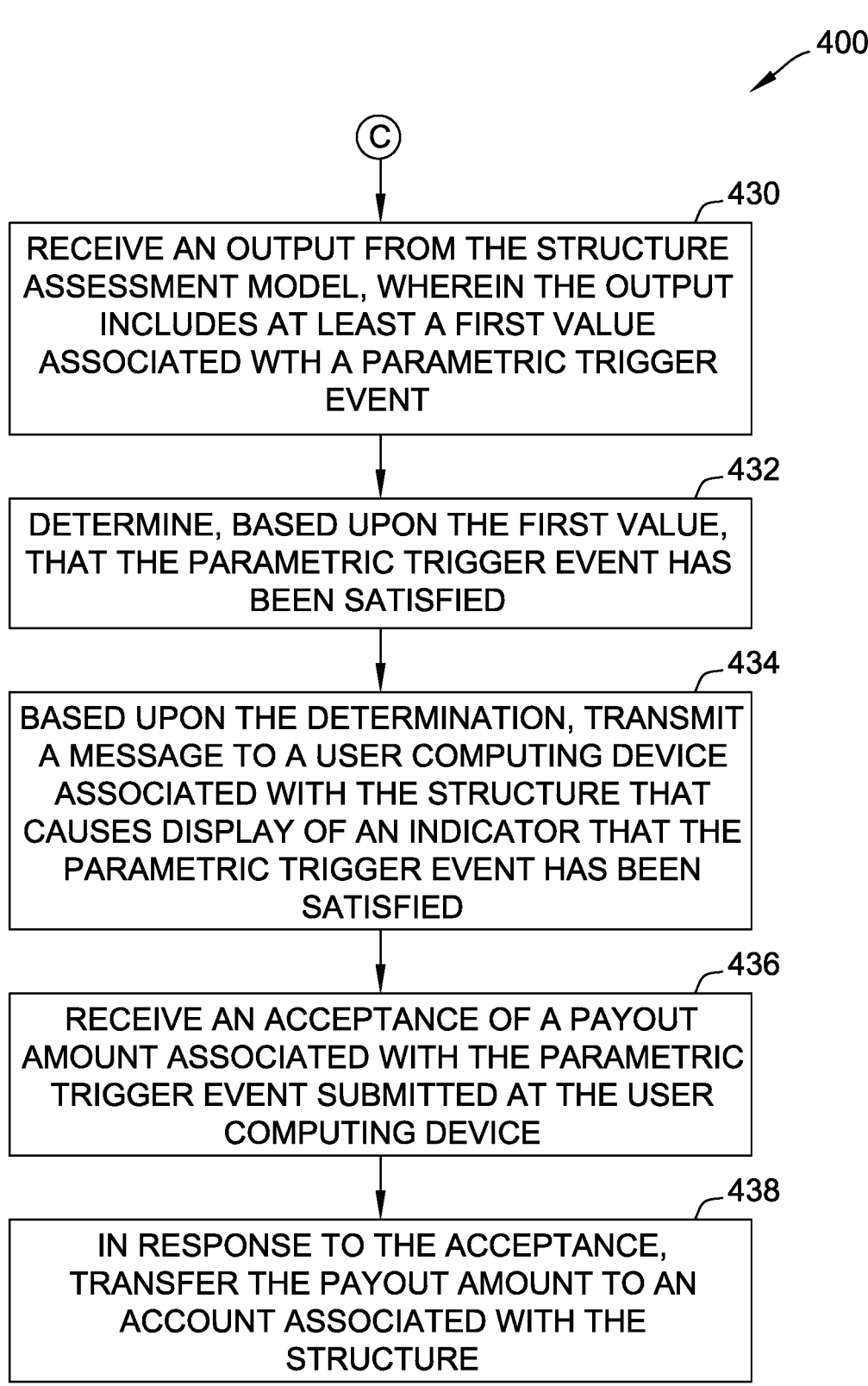

400

Ⓒ

430
RECEIVE AN OUTPUT FROM THE STRUCTURE ASSESSMENT MODEL, WHEREIN THE OUTPUT INCLUDES AT LEAST A FIRST VALUE ASSOCIATED WTH A PARAMETRIC TRIGGER EVENT

432
DETERMINE, BASED UPON THE FIRST VALUE, THAT THE PARAMETRIC TRIGGER EVENT HAS BEEN SATISFIED

434
BASED UPON THE DETERMINATION, TRANSMIT A MESSAGE TO A USER COMPUTING DEVICE ASSOCIATED WITH THE STRUCTURE THAT CAUSES DISPLAY OF AN INDICATOR THAT THE PARAMETRIC TRIGGER EVENT HAS BEEN SATISFIED

436
RECEIVE AN ACCEPTANCE OF A PAYOUT AMOUNT ASSOCIATED WITH THE PARAMETRIC TRIGGER EVENT SUBMITTED AT THE USER COMPUTING DEVICE

438
IN RESPONSE TO THE ACCEPTANCE, TRANSFER THE PAYOUT AMOUNT TO AN ACCOUNT ASSOCIATED WITH THE STRUCTURE

FIG. 4D

SYSTEMS AND METHODS FOR ANALYZING STRUCTURAL DAMAGE IMAGES USING MACHINE LEARNING

CROSS-REFERENCE TO RELATED APPLICATIONS

This application claims the benefit of priority to U.S. Provisional Patent Application Ser. No. 63/488,578, filed Mar. 6, 2023, and entitled "SYSTEMS AND METHODS FOR ANALYZING STRUCTURAL DAMAGE IMAGES USING MACHINE LEARNING," the contents and disclosures of which are hereby incorporated in their entirety.

FIELD OF THE DISCLOSURE

The present disclosure relates to analyzing images using machine learning techniques, and more particularly, to computer-based systems and methods for analyzing images of structural damage using machine learning techniques.

BACKGROUND

A roof and/or other structural components of a building may be susceptible to damage during storms and/or other damaging conditions. For example, a hailstorm may impact a roof of a building. The hail stones may create impact holes in the roof and/or structurally weaken the roof. The roof may also be susceptible to other damaging conditions that are not directly related to weather, such as tree limbs falling on the roof. When damage to the roof is suspected, a homeowner and/or other occupant of the building may attempt to and/or contact another party to determine the extent of damage to the roof. Based upon the damage, a cost of repairing or replacing the damaged roof may be estimated.

To determine an extent of damage to a roof, in at least some known systems, a representative may visit the building. The representative may assess the damage to the roof by analyzing a particular portion of the roof. In at least some examples, the representative may be required to climb onto or near the roof to assess the damage. In some cases, the damage to the roof may be extensive and may cause the roof to be unable to support the representative, which may increase the risk of potential injuries. Multiple representatives may visit the building together to reduce the risk of potential injuries at the building. Moreover, scheduling in-person visits to a building with suspected roof damage may be time-consuming and may extend the time needed to assess the roof damage.

Systems and methods that address these problems are needed. Conventional techniques may include additional inefficiencies, encumbrances, ineffectiveness, and/or other drawbacks as well.

BRIEF SUMMARY

The present embodiments may relate to, inter alia, systems and methods for analyzing images of structural damage using machine learning. A computer system may train a machine learning model using historical images of structures. When the computer system receives photographic data including one or more images of a subject structure (e.g., a roof that may have been damaged), the computer system may apply the one or more images to the trained machine learning model, which may generate an output including one or more determinations made about the subject structure.

These determinations may include, for example, an estimated cost of repairing or replacing the structure.

In one aspect, a computer system for analyzing images of structural damage using machine learning may be provided. The system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, a computer system may include at least one memory and at least one processor in communication with the at least one memory. The processor may be programmed to: (1) receive photographic data including one or more images of a structure; (2) in response to receiving the photographic data, apply the photographic data to a structure assessment model configured to determine a structural status of the structure, wherein the structure assessment model is trained using historical photographic data including a plurality of historical images of structures; (3) receive an output from the structure assessment model, wherein the output at least one determined characteristic of the structure; and/or (4) based upon the output, transmit a message to a user computing device associated with the structure that causes display of the determined characteristic. The computer system may include additional, less, or alternate functionality, including that discussed elsewhere herein.

In another aspect, a computing device for analyzing structural damage images may be provided. The computing device may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the computing device may include at least one memory and at least one processor in communication with the at least one memory. The at least one processor may be configured to receive photographic data including one or more images of a structure. The at least one processor may be further configured to, in response to receiving the photographic data, apply the photographic data to a structure assessment model configured to determine a structural status of the structure, wherein the structure assessment model is trained using historical photographic data including a plurality of historical images of structures. The at least one processor may be further configured to, receive an output from the structure assessment model, wherein the output includes at least an estimated cost of repairing damage having occurred to the structure. The at least one processor may be further configured to, based upon the output, transmit a message to a user computing device associated with the structure that causes display of the estimated cost. The server computing device may include additional, less, or alternate functionality, including that discussed elsewhere herein.

In another aspect, a computer-implemented method for analyzing structural damage images may be provided. The computer-implemented method may be implemented via one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the method may be performed by a server computing device including at least one memory and at least one processor in communication with the at least one memory. The computer-implemented method may include (1) receiving, by the server computing device, photographic data including one or more images of a structure; (2) in response to receiving the photographic data, applying, by the server computing device, the photographic data to a structure assessment model configured to determine a structural status of the structure, wherein the structure assessment model is trained using historical photographic data including a plurality of historical images of structures; (3) receiving, by the server computing device, an output from the structure assessment model, wherein the output includes at least an estimated cost of repairing damage having occurred to the structure; and/or (4) based upon the output, transmitting, by the server computing device, a message to a user computing device associated with the structure that causes display of the estimated cost. The computer-implemented method may include additional, less, or alternate functionality, including that discussed elsewhere herein.

In another aspect, at least one non-transitory computer-readable storage media having computer-executable instructions embodied thereon may be provided. The computer-executable instructions method may be executed using one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, when executed by a server computing device including at least one memory and at least one processor in communication with the at least one memory, the computer-executable instructions may cause the at least one processor to receive photographic data including one or more images of a structure. The computer-executable instructions may further cause the processor to, in response to receiving the photographic data, apply the photographic data to a structure assessment model configured to determine a structural status of the structure, wherein the structure assessment model is trained using historical photographic data including a plurality of historical images of structures. The computer-executable instructions may further cause the processor to receive an output from the structure assessment model, wherein the output includes at least an estimated cost of repairing damage having occurred to the structure. The computer-executable instructions may further cause the processor to, based upon the output, transmit a message to a user computing device associated with the structure that causes display of the estimated cost. The at least one non-transitory computer-readable storage media may include additional, less, or alternate functionality, including that discussed elsewhere herein.

In another aspect, a computing device for analyzing structural damage images may be provided. The computing device may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the computing device may include at least one memory and at least one processor in communication with the at least one memory. The at least one processor may be configured to receive photographic data including one or more images of a structure. The at least one processor may be further configured to, in response to receiving the photographic data, apply the photographic data to a structure assessment model configured to determine a structural status of the structure, wherein the structure assessment model is trained using historical photographic data including a plurality of historical images of structures. The at least one processor may be configured to receive photographic data including one or more images of a structure. The at least one processor may be further configured to receive an output from the structure assessment model, wherein the output includes at least a first value associated with a parametric trigger event. The at least one processor may be configured to receive photographic data including one or more images of a structure. The at least one processor may be further configured to determine, based upon the first value, that the parametric trigger event has been satisfied. The at least one processor may be configured to receive photographic data including one or more images of a structure. The at least one processor may be further configured to, based upon the determination, transmit a message to a user computing device associated with the structure that causes display of an indicator that the parametric trigger event has been satisfied. The server computing device may include additional, less, or alternate functionality, including that discussed elsewhere herein.

In another aspect, a computer-implemented method for analyzing structural damage images may be provided. The computer-implemented method may be implemented via one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the method may be performed by a server computing device including at least one memory and at least one processor in communication with the at least one memory. The computer-implemented method may include (1) receiving, by the server computing device, photographic data including one or more images of a structure; (2) in response to receiving the photographic data, applying, by the server computing device, the photographic data to a structure assessment model configured to determine a structural status of the structure, wherein the structure assessment model is trained using historical photographic data including a plurality of historical images of structures; (3) receiving, by the server computing device, an output from the structure assessment model, wherein the output includes at least a first value associated with a parametric trigger event; (4) include determining, by the server computing device, based upon the first value, that the parametric trigger event has been satisfied; and/or (5) based upon the determination, transmitting, by the server computing device, a message to a user computing device associated with the structure that causes display of an indicator that the parametric trigger event has been satisfied. The computer-implemented method may include additional, less, or alternate functionality, including that discussed elsewhere herein.

In another aspect, at least one non-transitory computer-readable storage media having computer-executable instructions embodied thereon may be provided. The computer-executable instructions method may be executed using one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, when executed by a server computing device including at least one memory and at least one processor in communication with the at least one memory, the computer-executable instructions may cause the at least one processor to receive photographic data including one or more images of a structure. The computer-executable instructions may further cause the at least one processor to, in response to receiving the photographic data, apply the photographic data to a structure assessment model configured to determine a structural status of the structure, wherein the structure assessment model is trained using historical photographic data including a plurality of historical images of structures. The computer-executable instructions may further cause the at least one processor to receive an output from the structure assessment model, wherein the output includes at least a first value associated with a parametric trigger event. The computer-executable instructions may further cause the at least one processor to determine, based upon the first value, that the parametric trigger event has been satisfied. The computer-executable instructions may further cause the at least one processor to, based upon the determination, transmit a message to a user computing device associated with the structure that causes display of an indicator that the parametric trigger event has been satisfied. The at least one non-transitory computer-readable storage media may include additional, less, or alternate functionality, including that discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 4D is a continuation of the exemplary computer-implemented method shown in FIGS. 4A, 4B, and 4C.

DETAILED DESCRIPTION OF THE DRAWINGS

Figure 1:
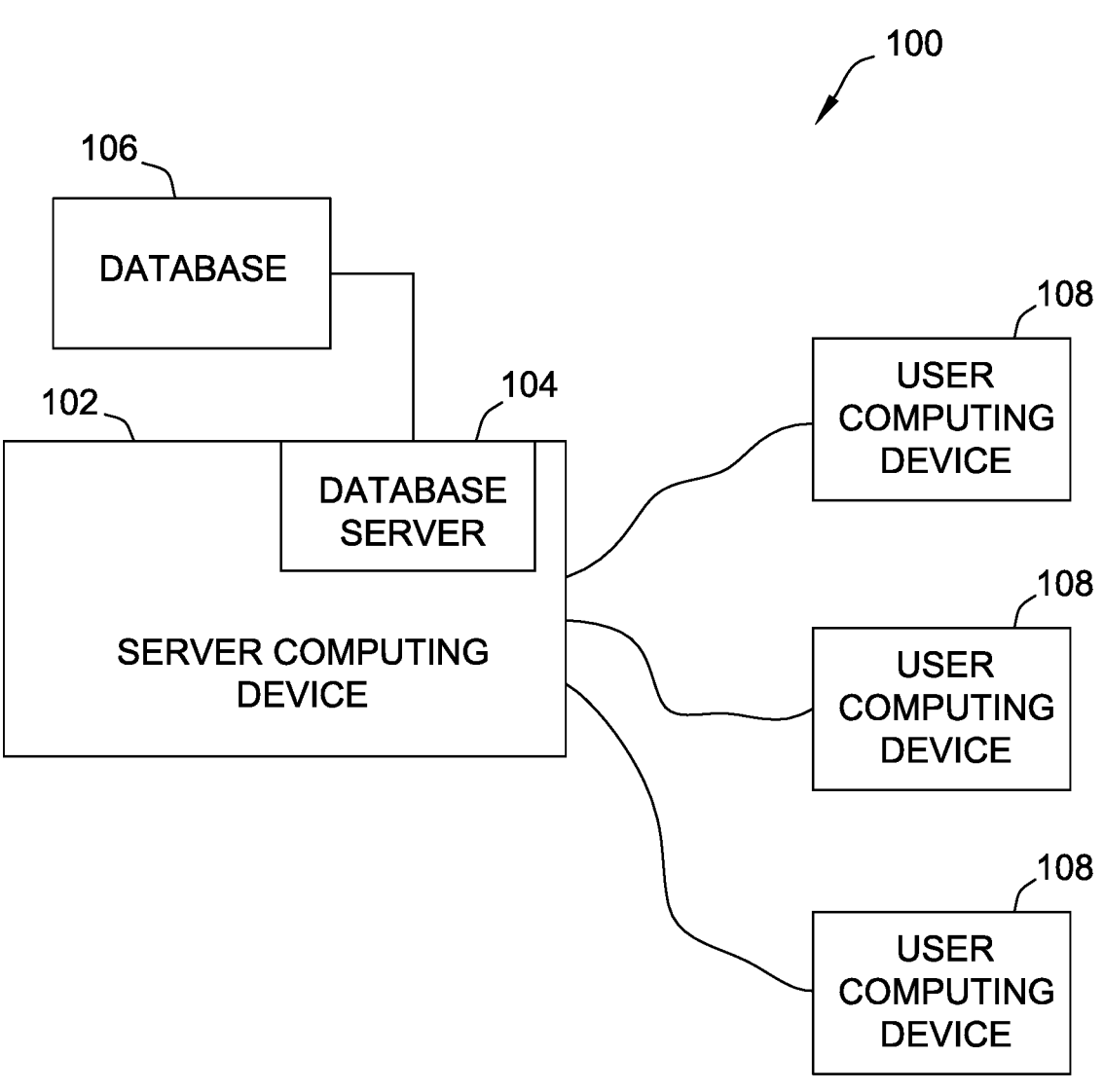
FIG. 1 depicts an exemplary computer system in accordance with an exemplary embodiment of the present disclosure.

The present embodiments may relate to, inter alia, systems and methods for analyzing images of structural damage using machine learning. For example, the systems and methods described herein may be configured to train a machine learning model, which may be used to make determinations about a structure (e.g., a roof that has been damaged in a storm) based upon one or more input images of the structure. Such determinations may include, for example, identifying characteristics (e.g., a roof material and/or shape) of the structure, determining an extent of damage that has occurred to the structure, estimating a cost of repairing or replacing the structure, and/or determining whether certain parameters have been met (e.g., being struck by hail of a certain diameter) during an event (e.g., a storm). In exemplary embodiments, the systems and methods may be performed by a server computing device.

In the exemplary embodiment, the server computing device may be configured to build and/or train a machine learning model (sometimes referred to herein as a "structure assessment model") that may be used to analyze images such images of roofs that have been damaged during a storm. The server computing device may train the machine learning model using a large number of historical images. For example, images of roofs labeled with certain data (e.g., roof material, known cost of repair of replacement if the roof is damaged) may be input, and the server computing device may identify between correlations between the data and images, such as which features of a roof image indicate that the roof has a certain material, amount of damage, and/or repair cost associated with the damage.

In the exemplary embodiment, the server computing device may receive photographic data including one or more images of a structure (e.g., a roof). The server computing device may be in communication with one or more user computing devices configured to execute a mobile application ("app"). The user computing devices may be associated with a user such as, for example, an owner and/or insurance policyholder of the structure and/or insurance claim personnel. The app may prompt the user to take one or more photos and/or videos (e.g., from different angles with respect to the structure), which may be transmitted to the server computing device. In some embodiments, the server computing device may determine that additional images are needed, e.g., because the initially submitted images do not enable the structure assessment model to output determinations with a requisite and/or threshold confidence score. The server computing device may prompt (e.g., via the app) the user to submit additional images, in some cases, with instructions as to specific images (e.g., of certain locations of the structure) that would boost the confidence score. In some embodiments, artificial intelligence and/or chatbots (e.g., ChatGPT bots) may be used by the server computing device to generate such prompts.

In some embodiments, the photo and/or video taking process may be at least partially automated, with the app prompting the user to move the user computing device, which may automatically capture photos and/or videos when held at or carried to an appropriate position. In some embodiments, images of the structure may be captured by other sources (e.g., in communication with the server computing device and/or the user computing device). For example, drones, satellites, or other cameras integrated into infrastructure that have a view of the structure may be used to capture images and transmit the images to the server computing device.

In the exemplary embodiment, in response to receiving the photographic data, the server computing device may apply or input the photographic data to the trained structure assessment model. Based upon the input photographic data, the structure assessment model may output predictions relating to a status and/or characteristics of the structure, for example, a determined material, age, and/or shape (e.g., roof slope) of the structure, whether and how much damage has occurred to the structure, a cost of repairing or replacing the structure, and/or whether certain specific events tied to parameters have occurred. With respect to any of these predictions, the structure assessment model may further output a confidence score. In some embodiments, the structure assessment model may further identify additional photographic data (e.g., images from positions from which an image has not yet been submitted) that may increase the confidence scores, and generate requests (e.g., via a prompt within the app) to submit the identified additional photographic data.

In the exemplary embodiment, based upon the output of the structure assessment model, the server computing device may transmit a message to the user computing device that causes the user computing device to display (e.g., via the app) one or more of the predictions made using the structure assessment model. In some embodiments, these predictions may be used to determine an insurance payout. For example, the insurance payout may be determined based upon an estimated cost of repairing and/or replacing the structure (e.g., whichever or repair or replacement costs less). Alternatively, the payout may be a fixed amount that is triggered based upon satisfaction of a certain parameter (e.g., occurrence of a certain hail size, wind speed, or precipitation amount), which may be defined by a smart contract. The determined payout may be displayed by the user computing device within the app, and in some embodiments, the app may prompt the user to approve the payout (e.g., if the user is the policyholder and satisfied with the payout amount), and if approved, the server computing device may automatically cause the payout amount to be transferred to an account associated with the policyholder.

Training a Machine Learning Model

In the exemplary embodiment, the server computing device may be configured to train a machine learning model, referred to as a structure assessment module, for analyzing images of structures to determine a status of the structures. In some embodiments, the server computing device may generate and/or train the structure assessment model using a training dataset that includes one or more training variables and/or model parameters, such as historical images (e.g., including images of roof structural damage), historical structural data (e.g., roof material, roof type, roof shape, etc.), roof age, and/or historical damage data associated with the historical images. The historical structural data may include, for example, roof material, roof age, shingle type, roof slant angle, age of roof, total area of a roof, and roof occlusion. The historical damage data may include, for example, data indicating damage to a structure has occurred and/or data relating to costs of, for example, repairing and/or replacing roofs associated with the historical images.

In other embodiments, the server computing device may generate the structure assessment model in a different format. For example, the structure or roof assessment model may be a function for receiving data (e.g., photographic data) for a subject structure (e.g., roof) and generating an output for determining a status of the subject structure.

The server computing device may be configured to generate the structure assessment model by analyzing historical images and/or historical records associated with the historical images. The server computing device may be configured to perform a statistical analysis of the historical images and/or historical records to generate the structure assessment model. For example, for a particular feature that may be found within an image of a structure (e.g., a shape and/or color), the server computing device may identify historical images associated with the feature and generate model parameters (e.g., by identifying other parameters held in common among the identified historical images). For example, the server computing device may identify features correlated with a particular roof material, or with respect to a particular roof material, which features of an image indicate that the roof has become damaged. In other embodiments, the server computing device may be configured to perform a different analysis that is suitable to generate the structure assessment model.

The structure assessment model may be associated with and/or include a parametric engine. The parametric engine represents a relationship between input data such as training variables and/or predicted outputs. The training variables may be parameterized allowing the parametric engine to be tuned to generate accurate outputs. Parameterized training variables may be weighted using weighting coefficients. The parametric engine may be tuned to determine a magnitude and/or a direction of the weighting coefficients. Tuning may include iteratively using the parametric model to generate model outputs that correspond to an actual event, such as a historical event, while adjusting the magnitude and direction of the weight coefficients until the error between the model output and the actual event is reduced to an acceptable level. Tuning may be performed in addition to, and/or in combination with, training the model using historical data.

The parametric engine may use the weighted coefficients to rank an importance or influence of a model training variable. For example, the greater the weighting factor the greater the importance the server computing device will associate with that variable when tuning the model. Likewise, the smaller the weighting factor the lesser the importance that the server computing device will associate with the variable when tuning the model. In some embodiments, the server computing device may weight variables associated with the historical photographic data greater than any other model training variables.

For example, the server computing device may weight the historical damage data of the historical images with a weight factor, for example, suitably greater than 50%, suitably greater than 75%, and/or suitably greater than 90%. In another example, the server computing device weights the historical damage data with the greatest weight factor, greater than the weighting factors than any of the other model training variables. In another example, the server computing device may weigh the historical damage data and the roof structural data with the greatest two weighting factors, for example, weighting factors greater than the weighting factor for any of the other model training variables.

In some embodiments, the server computing device may use a reduced number of training variables (e.g., one or more training variables) that have the greatest weighting factors (e.g., the variables that are ranked with the most importance). The reduced and more focused training dataset, including the training variables with the greatest weights, decreases computational load and will have decreased model training time allowing the model to be more quickly updated as more historical image records are created and added to the subset training dataset. The server computing device may generate a training dataset including less than five model training variables and/or less than three model training variables, for example.

The server computing device may also determine a confidence score for one or more of the model outputs. The confidence score may be associated with a percent likelihood a determined property status is a correct assessment of the structure damage. For example, the confidence score may be between zero and one. A confidence score close to one (e.g., greater than one-half) indicates that the determined property status likely accurately reflects the actual structure damage.

Preferably, a structural status, or component of a structural status (e.g., a cost of repairing or replacing the structure), with a confidence score of one, indicates that the model determined property status is the same, or substantially the same, as an assessment of the structure damage determined, for example, by an in-person inspection. For example, a repair and/or replacement cost associated with the structural status, as predicted by the model would match, or substantially matches, a cost determined by an in-person inspection, and/or the actual cost to repair the damage.

Additionally or alternatively, the parametric triggers or parametric trigger events may be used to initiate an action, such as prepare an insurance claim for a user's review and submission, estimate an insurance claim payout, transfer monies to an insured's bank account automatically, initiate or handle a claim automatically or partially, or take other actions, including those discussed elsewhere herein. In certain embodiments, parametric triggers may be determined from gathering and/or analyzing sensor or other data, and comparing the data gathered with a baseline or threshold, and if the baseline is deviated from or the threshold met or exceeded, then the parametric trigger may be deemed to have been met. The parametric triggers may be established in other manners as well, including those discussed elsewhere herein.

Retrieving Photographic Data

In the exemplary embodiment, the server computing device may be configured to receive photographic data. A user computing device may transmit photographic data to the server computing device. The user computing device may be configured to execute an app, which may include a user interface (e.g., a graphical user interface (GUI)). The user computing device may be configured to, in response to receiving instruction from the server computing device, prompt a user to submit photographic data (e.g., images of the structure) within this user interface. The prompt may include specific detail about the images needed in order to perform the evaluation. For example, the prompt may include a message requesting a certain number of images of the front, back, and sides of a roof be submitted. The user may submit images through the user interface, for example, by selecting from among saved (e.g., locally and/or in the cloud) images and/or by capturing new images (e.g., via the app controlling a camera of the user computing device).

In some embodiments, the images may be captured automatically. For example, the prompt may direct the user to hold a camera of the user computing device up to the structure and move around the structure, and the server computing device and/or user computing device may determine, based upon the resulting video feed, when to automatically capture and/or save images and/or prompt the user where to reposition the camera. This determination may be made in real time (e.g., by capturing images as the camera is moved) or, alternatively, by analyzing the entire video feed upon its completion (e.g., to identify appropriate images that may be captured at certain points within the video).

In some embodiments, once the user has submitted one or more initial images of a structure, the server computing device may update the prompting (e.g., in real time) based upon the submitted images. For example, before, concurrently with, or after analyzing the images (e.g., using the structure assessment model), the server computing device may determine that certain additional images would increase the effectiveness of the analysis, and prompt the user to submit additional images. For example, if an initial image of a front of the roof is too blurry, the app may prompt the user "Please submit another image of the front of the roof."

In another example, if an initial image of the front of the roof does not show the entire front of the roof, the app may prompt the user "Please stand farther away from the front of the roof and capture another image." In another example, the server computing device may identify damage at a top corner of the front of the roof. Because an additional of the damage may be helpful for the evaluation, the app may prompt the user "Please submit another image of the damaged top corner of the roof." In some such embodiments, the server computing device may determine that additional images are needed in response to a confidence score output by the structure assessment model failing to satisfy a threshold confidence score.

In some embodiments, the server computing device and/or user computing device may be in communication with other devices (e.g., drones and/or satellites) that may be controlled to capture images of the structure. For example, the server computing device and/or user computing device may be configured to control an arial drone to capture images of a structure from different angles determined by the server computing device and/or user computing device. Once captured (e.g., by the drone), such images may be transmitted to the server computing device for analyzing the images. The server computing device and/or user computing device may generate a flight plan and/or other commands for the drone to execute in order to capture the images. Similarly to how the user prompt may be updated as described above, the flight plan of the drone may be dynamically adjusted once one or more images are process, so that the drone may capture additional images helpful for the analysis. In some embodiments, other images previously taken of the damage, such as images captured by drones, satellites, or other users (e.g., images posted to social media), may be retrieved by the server computing device and/or user computing device (e.g., via the Internet or from a database).

In some embodiments, in addition to photographic data, the server computing device may receive other data relating to the subject structure. Such data may include, for example, a location of the structure, an owner of the structure, an insurance policy associated with the structure, an insurance policyholder of the structure, or any other data relating to the structure. Such data may be submitted at the user computing device via the app (e.g., in response to a prompt and/or into a form) and/or automatically retrieved from other sources (e.g., the Internet and/or databases), and in some cases, may also be factored into the structure assessment model when determining the status of the subject structure.

In some embodiments, when photographic data and/or other data is received, the structure assessment model may be updated based upon the photographic data and/or other data. For example, the server computing device may generate a new historical record that the received photographic data, other data, and/or a determined structural status of a structure and re-training the trained structure assessment model using the new and/or updated historical records.

Analyzing Photographic Data Using a Machine Learning Model

In the exemplary embodiment, the server computing device may be configured to analyze photographic data using a machine learning model to determine a status of a structure. Based upon the input photographic data, the structure assessment model may output predictions relating to a status of the structure, for example, a determined material, age, and/or shape (e.g., roof slope) of the structure, whether and how much damage has occurred to the structure, a cost of repairing or replacing the structure, and/or whether certain specific events tied to parameters have occurred.

Upon receipt of the photographic data and/or other data relating to the subject structure, the server computing device may retrieve the structure assessment model for evaluating the received data. The evaluation may include applying the photographic data and/or other data to the structure assessment model. The structure assessment model may output one or more structural statuses. In some cases, one or more structural statuses may be generated for a single structure and/or roof, for example, various structural statuses may be generated for various regions of the roof such as, for example, a structural status of an eastern facing side of the roof and/or a structural status for a western facing side of the roof. Each of the determined structural statuses may include a severity level associated with the structural statuses and/or a status description. The structural statuses may include values such as, for example, estimated repair and/or replacement costs, discrete status indicators (e.g., no damage, damage, and/or totaled), and/or indicators of whether certain parameters (e.g., hail presence and/or size, wind speed threshold, etc.) have been met. In some embodiments, the server computing device may output a recommendation (e.g., an amount of funds needed to repair or replace the roof, which may be automatically approved upon a claim submission) based upon the determined structural status.

In some embodiments, the server computing device may use the determined structural status for performing one or more operations associated with providing a payment to compensate the policyholder associated with the structure. In some embodiments, the determined structural status is stored until a policyholder submits a claim. In some embodiments, the server computing device may perform one or more underwriting operations associated with providing an insurance quote. In some embodiments, the server computing device may transmit data, for example, a settlement amount (e.g., an estimated repair or replacement cost minus a deductible) and/or one or more structural statuses to the user associated with the building. Such data may be presented via the app executing on the user computing device. Alternatively, contact information for the user may be retrieved from, (e.g., contact information provided for an insurance policy of the roof and/or other data sources that store contact information) data storage devices. In some cases, a settlement amount or reimbursement funds (e.g., the determined repair and/or replacement cost or another payout) may be automatically routed directly to an account of the policyholder and/or routed to the account of the policyholder in response to an approval of the amount by the policyholder (e.g., via the app).

In some embodiments, the server computing device may transmit the determined property status. For example, the server computing device may transmit a message that causes the user computing device to present the determined property status (e.g., via the app). In some embodiments, the message may cause the user computing device to prompt the user to perform one or more actions. For example, the user computing device may prompt the user to initiate a claim. The prompt may request that the user confirm a claim submission for the covered loss (e.g., by selecting a selector that is caused to be displayed). For example, the prompt may request that the user selects at least one of a yes (e.g., proceed) selector or a no (e.g., decline) selector of the claim submission.

After the server computing device has determined the structural status, and/or after the user has confirmed the initiation of a claim submission, the API may transmit one or more messages that prompt the user to accept a settlement amount associated with the determined structural status (e.g., based upon the estimated repair or replacement cost). The user computing device may present the settlement amount to a user and a prompt requesting the user to select at least one of a yes (e.g., accept the issuance of the settlement amount) selector or a no (e.g., decline the issuance of the settlement amount) selector. In some embodiments, if the user selects yes, the settlement amount may be issued such that the settlement amount is directly deposited (e.g., via electronic deposit), in a financial account of the policyholder.

In some embodiments, the insurance policy may be a parametric insurance policy, in which a fixed amount (in contrast to an amount based upon an estimated repair or replacement cost) is paid to the policyholder in response to a certain parameter being satisfied. Such parameters may include, for example, hail occurring at a given location, hail of a certain diameter falling at a certain location, wind speed at a location exceeding a threshold, or other such parameters for which a discrete "true" or "false" value may be determined for a given instance. Whether such parameters have been satisfied may be determined based upon outputs of the structure assessment model, as described above.

If the server computing device determines that a parameter associated with a parametric insurance policy has been satisfied, the server computing device may automatically transfer a transfer of funds from the insurer to a financial account associated with the policyholder. Alternatively, if the server computing device determines that a parameter associated with a parametric insurance policy has been satisfied, the server computing device may cause the user computing device to display a message indicating that the parameter has been satisfied and/or the associated payout, and/or prompt approval of the payout, similarly to the embodiments described above in which the payout is determined based upon an estimated repair or replacement cost.

Additionally or alternatively, the parametric triggers or parametric trigger events may be used to initiate an action, such as prepare an insurance claim for a user's review and submission, estimate an insurance claim payout, transfer monies to an insured's bank account automatically, initiate or handle a claim automatically or partially, or take other actions, including those discussed elsewhere herein. In certain embodiments, parametric triggers may be determined from gathering and/or analyzing sensor or other data, and comparing the data gathered with a baseline or threshold, and if the baseline is deviated from or the threshold met or exceeded, then the parametric trigger may be deemed to have been met. The parametric triggers may be established in other manners as well, including those discussed elsewhere herein.

At least one technical problems addressed by this system may include: (i) difficulty in accessing damaged structures to assess damage; (ii) inability of a computer system to determine a repair or replacement cost for a structure by analyzing images; (iii) inability of a computer system to train a structure assessment machine learning model; (iv) necessity of user input for a computer system to determine a repair or replacement cost for a structure; and/or (v) time delay in determining a repair or replacement cost by a computer system due to a necessity of manual retrieval and analysis of data.

A technical effect of the systems and processes described herein may be achieved by performing at least one of the following steps: (i) receiving photographic data including one or more images of a structure; (ii) in response to receiving the photographic data, applying the photographic data to a structure assessment model configured to determine a structural status of the structure, wherein the structure assessment model is trained using historical photographic data including a plurality of historical images of structures; (iii) receiving an output from the structure assessment model, wherein the output at least one determined characteristic of the structure; and/or (iv) based upon the output, transmitting a message to a user computing device associated with the structure that causes display of the determined characteristic.

At least one technical effect achieved by this system may be one of: (i) eliminating need to access damaged structures to assess damage; (ii) ability for a computer system to determine a repair or replacement cost for a structure by analyzing images; (iii) ability for a computer system to train a structure assessment machine learning model; (iv) eliminating necessity of user input for a computer system to determine a repair or replacement cost for a structure; and/or (v) eliminating time delay in determining a repair or replacement cost by a computer system due to a necessity of manual retrieval and analysis of data.

Exemplary Computer System

FIG. 1 depicts an exemplary computer system 100. Computer system 100 may include a server computing device 102 including a database server 104. Computer system 100 may further include, in communication with server computing device 102, one or more of a database 106, and/or a user computing device 108. Server computing device 102 may also be in communication with other computing devices not shown in FIG. 1, such as computing devices associated with insurers, financial institutions, and/or entities that may provide data to server computing devices 102.

In the exemplary embodiment, server computing devices 102 may be configured to train a machine learning model, referred to as a structure assessment module, for analyzing images of structures to determine a status of the structures. In some embodiments, server computing devices 102 may generate and/or train the structure assessment model using a training dataset that includes one or more training variables, (e.g., model parameters), such as historical images (e.g., including images of roof structural damage), historical structural data (e.g., roof material, roof type, roof shape, etc.), roof age, and/or historical damage data associated with the historical images. The historical structural data may include roof material, roof age, shingle type, roof slant angle, age of roof, total area of a roof, and roof occlusion. The historical damage data may include data indicating damage to a structure has occurred and/or data relating to costs of repairing and/or replacing roofs associated with the historical images. In other embodiments, server computing devices 102 may generate the structure assessment model in a different format. For example, the structure or roof assessment model may be a function for receiving data (e.g., photographic data) for a subject structure (e.g., roof) and generating an output for determining a status of the subject structure.

Server computing devices 102 may be configured to generate the structure assessment model by analyzing historical images and/or historical records associated with the historical images. Server computing devices 102 may be configured to perform a statistical analysis of the historical images and/or historical records to generate the structure assessment model. For example, for a particular feature that may be found within an image of a structure (e.g., a shape and/or color), server computing devices 102 may identify historical images associated with the feature and generate model parameters by identifying other parameters held in common among the identified historical images. For example, server computing devices 102 may identify features correlated with a particular roof material, or with respect to a particular roof material, which features of an image indicate that the roof has become damaged. In other embodiments, server computing devices 102 may be configured to perform a different analysis that is suitable to generate the structure assessment model.

The structure assessment model may be associated with and/or include a parametric engine. The parametric engine represents a relationship between input data, training variables, and/or predicted outputs. The training variables may be parameterized allowing the parametric engine to be tuned to generate accurate outputs. Parameterized training variables may be weighted using weighting coefficients. The parametric engine may be tuned to determine a magnitude and/or a direction of the weighting coefficients. Tuning may include iteratively using the parametric model to generate model outputs that correspond to an actual event (e.g., a historical event), while adjusting the magnitude and direction of the weight coefficients until the error between the model output and the actual event is reduced to an acceptable level. Tuning may be performed in addition to, and/or in combination with, training the model using historical data.

The parametric engine may use the weighted coefficients to rank an importance or influence of a model training variable. For example, the greater the weighting factor the greater the importance server computing devices 102 will associate with that variable when tuning the model. Likewise, the smaller the weighting factor the lesser the importance that server computing devices 102 will associate with the variable when tuning the model. In some embodiments, server computing devices 102 may weight variables associated with the historical photographic data greater than any other model training variables.

For example, server computing devices 102 may weight the historical damage data of the historical images with a weight factor, for example, suitably greater than 50%, suitably greater than 75%, and/or suitably greater than 90%. In another example, the server computing device weights the historical damage data with the greatest weight factor, greater than the weighting factors than any of the other model training variables. In another example, server computing devices 102 may weigh the historical damage data and the roof structural data with the greatest two weighting factors, for example, greater than the weighting factor for any of the other model training variables.

In some embodiments, server computing devices 102 may use a reduced number of training variables (e.g., one or more training variables), that have the greatest weighting factors (e.g., the variables that are ranked with the most importance). The reduced and more focused training dataset, including the training variables with the greatest weights, decreases computational load and will have decreased model training time allowing the model to be more quickly updated as more historical image records are created and added to the subset training dataset. Server computing devices 102 may generate a training dataset including less than five model training variables and/or less than three model training variables, for example.

Server computing device 102 may also determine a confidence score for one or more of the model outputs. The confidence score may be associated with a percent likelihood a determined property status is a correct assessment of the structure damage. For example, the confidence score may be between zero and one. A confidence score close to one (e.g., greater than one-half), indicates that the determined property status likely accurately reflects the actual structure damage.

Preferably, a structural status, or component of a structural status (e.g., a cost of repairing or replacing the structure), with a confidence score of one, indicates that the model determined property status is the same, or substantially the same, as an assessment of the structure damage determined, for example, by an in-person inspection. For example, a repair and/or replacement cost associated with the structural status, as predicted by the model would match, or substantially matches, a cost determined by an in-person inspection, and/or the actual cost to repair the damage.

In the exemplary embodiment, server computing device 102 may be configured to receive photographic data. User computing device 108 may transmit photographic data to server computing device 102. User computing device 108 may be configured to execute an app, which may include a user interface (e.g., a GUI). User computing device 108 may be configured to, in response to receiving instruction from server computing device 102, prompt a user to submit photographic data (e.g., images of the structure) within this user interface.

The prompt may include specific detail about the images needed in order to perform the evaluation. For example, the prompt may include a message requesting a certain number of images of the front, back, and sides of a roof be submitted. The user may submit images through the user interface, for example, by selecting from among saved (e.g., locally and/or in the cloud) images and/or by capturing new images (e.g., via the app controlling a camera of user computing device 108).

In some embodiments, the images may be captured automatically. For example, the prompt may direct the user to hold a camera of user computing device 108 up to the structure and move around the structure, and server computing device 102 and/or user computing device 108 may determine, based upon the resulting video feed, when to automatically capture and/or save images and/or prompt the user where to reposition the camera. This determination may be made in real time (e.g., by capturing images as the camera is moved) or, alternatively, by analyzing the entire video feed upon its completion (e.g., to identify appropriate images that may be captured at certain points within the video).

In some embodiments, once the user has submitted one or more initial images of a structure, server computing device 102 may update the prompting (e.g., in real time) based upon the submitted images. For example, before, concurrently with, or after analyzing the images (e.g., using the structure assessment model), server computing device 102 may determine that certain additional images would increase the effectiveness of the analysis, and prompt the user to submit additional images. For example, if an initial image of a front of the roof is too blurry, the app may prompt the user "Please submit another image of the front of the roof." In another example, if an initial image of the front of the roof does not show the entire front of the roof, the app may prompt the user "Please stand farther away from the front of the roof and capture another image."

In another example, server computing device 102 may identify damage at a top corner of the front of the roof. Because an additional of the damage may be helpful for the evaluation, the app may prompt the user "Please submit another image of the damaged top corner of the roof." In some such embodiments, server computing device 102 may determine that additional images are needed in response to a confidence score output by the structure assessment model failing to satisfy a threshold confidence score.

In some embodiments, server computing device 102 and/or user computing device 108 may be in communication with other devices (e.g., drones and/or satellites) that may be controlled to capture images of the structure. For example, server computing device 102 and/or user computing device 108 may be configured to control an arial drone to capture images of a structure from different angles determined by server computing device 102 and/or user computing device 108. Once captured (e.g., by the drone), such images may be transmitted to server computing device 102 for analyzing the images. Server computing device 102 and/or user computing device 108 may generate a flight plan and/or other commands for the drone to execute in order to capture the images. Similarly to how the user prompt may be updated as described above, the flight plan of the drone may be dynamically adjusted once one or more images are process, so that the drone may capture additional images helpful for the analysis. In some embodiments, other images previously taken of the damage, such as images captured by drones, satellites, or other users (e.g., images posted to social media), may be retrieved by server computing device 102 and/or user computing device 108 (e.g., via the Internet or from a database such as database 106).

In some embodiments, in addition to photographic data, server computing device 102 may receive other data relating to the subject structure. Such data may include, for example, a location of the structure, an owner of the structure, an insurance policy associated with the structure, an insurance policyholder of the structure, or any other data relating to the structure. Such data may be submitted at user computing device 108 via the app (e.g., in response to a prompt and/or into a form) and/or automatically retrieved from other sources (e.g., the Internet and/or databases such as database 106), and in some cases, may also be factored into the structure assessment model when determining the status of the subject structure.

In some embodiments, when photographic data and/or other data is received, the structure assessment model may be updated based upon the photographic data and/or other data. For example, server computing device 102 may generate a new historical record that the received photographic data, other data, and/or a determined structural status of a structure and re-training the trained structure assessment model using the new and/or updated historical records.

In the exemplary embodiment, server computing device 102 may be configured to analyze photographic data using a machine learning model to determine a status of a structure. Based upon the input photographic data, the structure assessment model may output predictions relating to a status of the structure such as, for example, a determined material, age, and/or shape (e.g., roof slope) of the structure, whether and how much damage has occurred to the structure, a cost of repairing or replacing the structure, and/or whether certain specific events tied to parameters have occurred.

Upon receipt of the photographic data and/or other data relating to the subject structure, server computing device 102 may retrieve the structure assessment model for evaluating the received data. The evaluation may include applying the photographic data and/or other data to the structure assessment model. The structure assessment model may output one or more structural statuses. In some cases, one or more structural statuses may be generated for a single structure and/or roof. For example, various structural statuses may be generated for various regions of the roof (e.g., a structural status of an eastern facing side of the roof and/or a structural status for a western facing side of the roof). Each of the determined structural statuses may include a severity level associated with the structural statuses and/or a status description. The structural statuses may include values such as, for example, estimated repair and/or replacement costs, discrete status indicators (e.g., no damage, damage, and/or totaled), and/or indicators of whether certain parameters (e.g., hail presence and/or size, wind speed threshold, etc.) have been met. In some embodiments, server computing device 102 may output a recommendation (e.g., an amount of funds needed to repair or replace the roof, which may be automatically approved upon a claim submission) based upon the determined structural status.

In some embodiments, server computing device 102 may use the determined structural status for performing one or more operations associated with providing a payment to compensate the policyholder associated with the structure. In some embodiments, the determined structural status is stored until a policyholder submits a claim. In some embodiments, server computing device 102 may perform one or more underwriting operations associated with providing an insurance quote. In some embodiments, server computing device 102 may transmit data, for example, a settlement amount (e.g., an estimated repair or replacement cost minus a deductible) and/or one or more structural statuses to the user associated with the building. Such data may be presented via the app executing on user computing device 108. Alternatively, contact information for the user may be retrieved from, (e.g., contact information provided for an insurance policy of the roof and/or other data sources that store contact information) data storage devices. In some cases, a settlement amount or reimbursement funds (e.g., the determined repair and/or replacement cost or another payout) may be automatically routed directly to an account of the policyholder and/or routed to the account of the policyholder in response to an approval of the amount by the policyholder (e.g., via the app).

In some embodiments, server computing device 102 may transmit the determined property status. For example, server computing device 102 may transmit a message that causes user computing device 108 to present the determined property status (e.g., via the app). In some embodiments, the message may cause user computing device 108 to prompt the user to perform one or more actions. For example, user computing device 108 may prompt the user to initiate a claim. The prompt may request that the user confirm a claim submission for the covered loss (e.g., by selecting a selector that is caused to be displayed). For example, the prompt may request that the user selects at least one of a yes (e.g., proceed) selector or a no (e.g., decline) selector of the claim submission.

After server computing device 102 has determined the structural status, and/or after the user has confirmed the initiation of a claim submission, the API may transmit one or more messages that prompt the user to accept a settlement amount associated with the determined structural status (e.g., based upon the estimated repair or replacement cost). User computing device 108 may present the settlement amount to a user and a prompt requesting the user to select at least one of a yes (e.g., accept issuance of funds) selector or a no (e.g., decline the issuance of funds) selector. In some embodiments, if the user selects yes, the settlement amount may be issued such that the settlement amount is directly deposited, e.g., electronic deposit, in a financial account of the policyholder.

In some embodiments, the insurance policy may be a parametric insurance policy, in which a fixed amount (in contrast to an amount based upon an estimated repair or replacement cost) is paid to the policyholder in response to a certain parameter being satisfied. Such parameters may include, for example, hail occurring at a given location, hail of a certain diameter falling at a certain location, wind speed at a location exceeding a threshold, or other such parameters for which a discrete "true" or "false" value may be determined for a given instance. Whether such parameters have been satisfied may be determined based upon outputs of the structure assessment model, as described above.

If server computing device 102 determines that a parameter associated with a parametric insurance policy has been satisfied, server computing device 102 may automatically transfer a transfer of funds from the insurer to a financial account associated with the policyholder. Alternatively, if server computing device 102 determines that a parameter associated with a parametric insurance policy has been satisfied, server computing device 102 may cause user computing device 108 to display a message indicating that the parameter has been satisfied and/or the associated payout, and/or prompt approval of the payout, similarly to the embodiments described above in which the payout is determined based upon an estimated repair or replacement cost.

Additionally or alternatively, the parametric triggers or parametric trigger events may be used to initiate an action, which may be performed (e.g., automatically) by server computing device 102, such as prepare an insurance claim for a user's review and submission, estimate an insurance claim payout, transfer monies to an insured's bank account automatically, initiate or handle a claim automatically or partially, or take other actions, including those discussed elsewhere herein. In certain embodiments, parametric triggers may be determined (e.g., by server computing device 102) from gathering and/or analyzing sensor or other data, and comparing the data gathered with a baseline or threshold, and if the baseline is deviated from or the threshold met or exceeded, then the parametric trigger may be deemed to have been met. The parametric triggers may be established in other manners as well, including those discussed elsewhere herein.

Exemplary Client Computing Device

Figure 2:
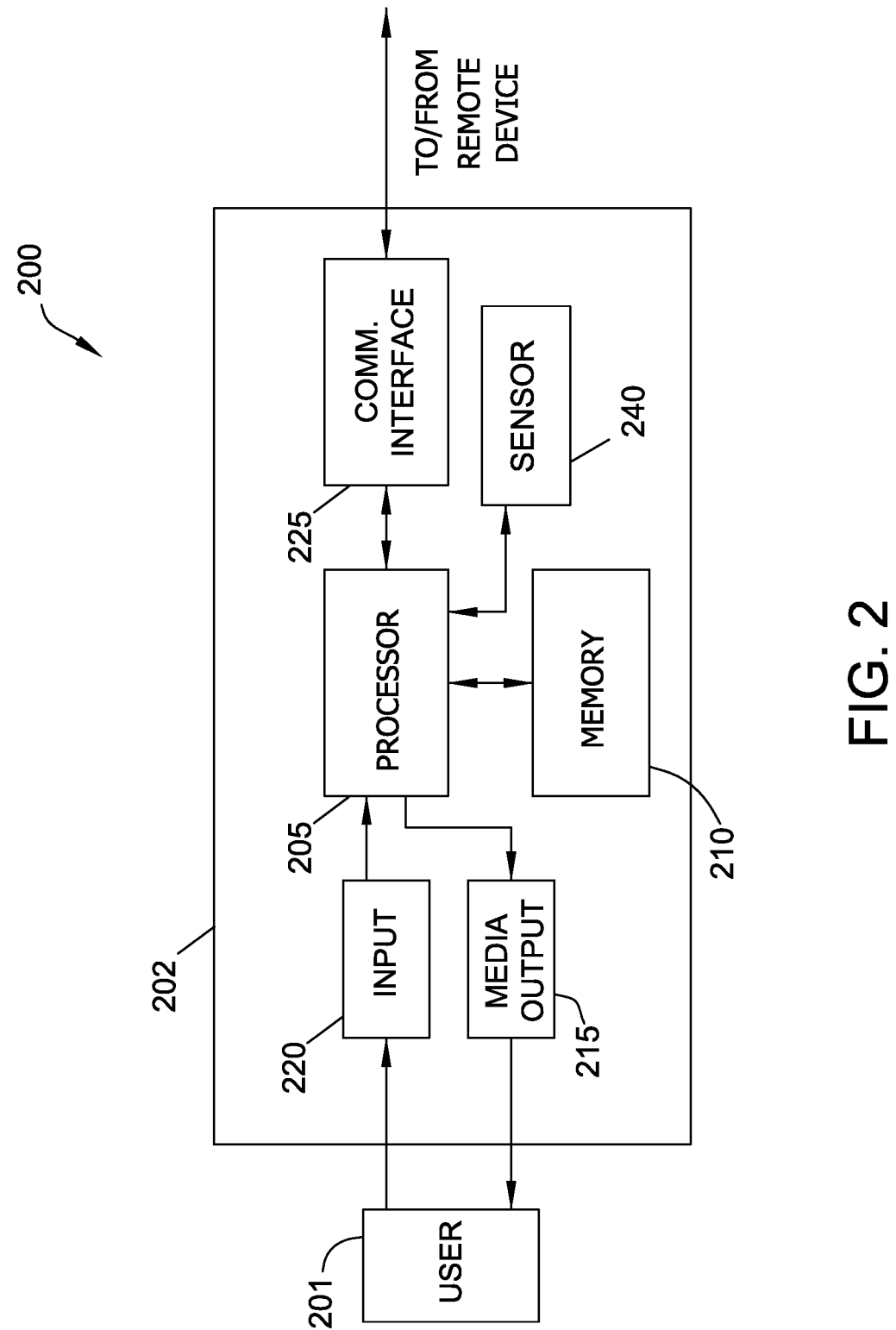
FIG. 2 depicts an exemplary client computing device that may be used with the computer system illustrated in FIG. 1.

FIG. 2 depicts an exemplary client computing device 202. Client computing device 202 may be, for example, user computing device 108.

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In certain exemplary embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as server computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

In some embodiments, client computing device 202 may also include sensors 240. Sensors 240 may include, for example, an accelerometer, a global positioning system (GPS), or a gyroscope. Sensors 240 may be used to collect telematics data, which may be transmitted by client computing device 202 to a remote device such as server computing device 102 (shown in FIG. 1).

Stored in memory area 210 may be, for example, computer readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website. A client application may allow user 201 to interact with a server application from server computing device 102 (shown in FIG. 1).

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
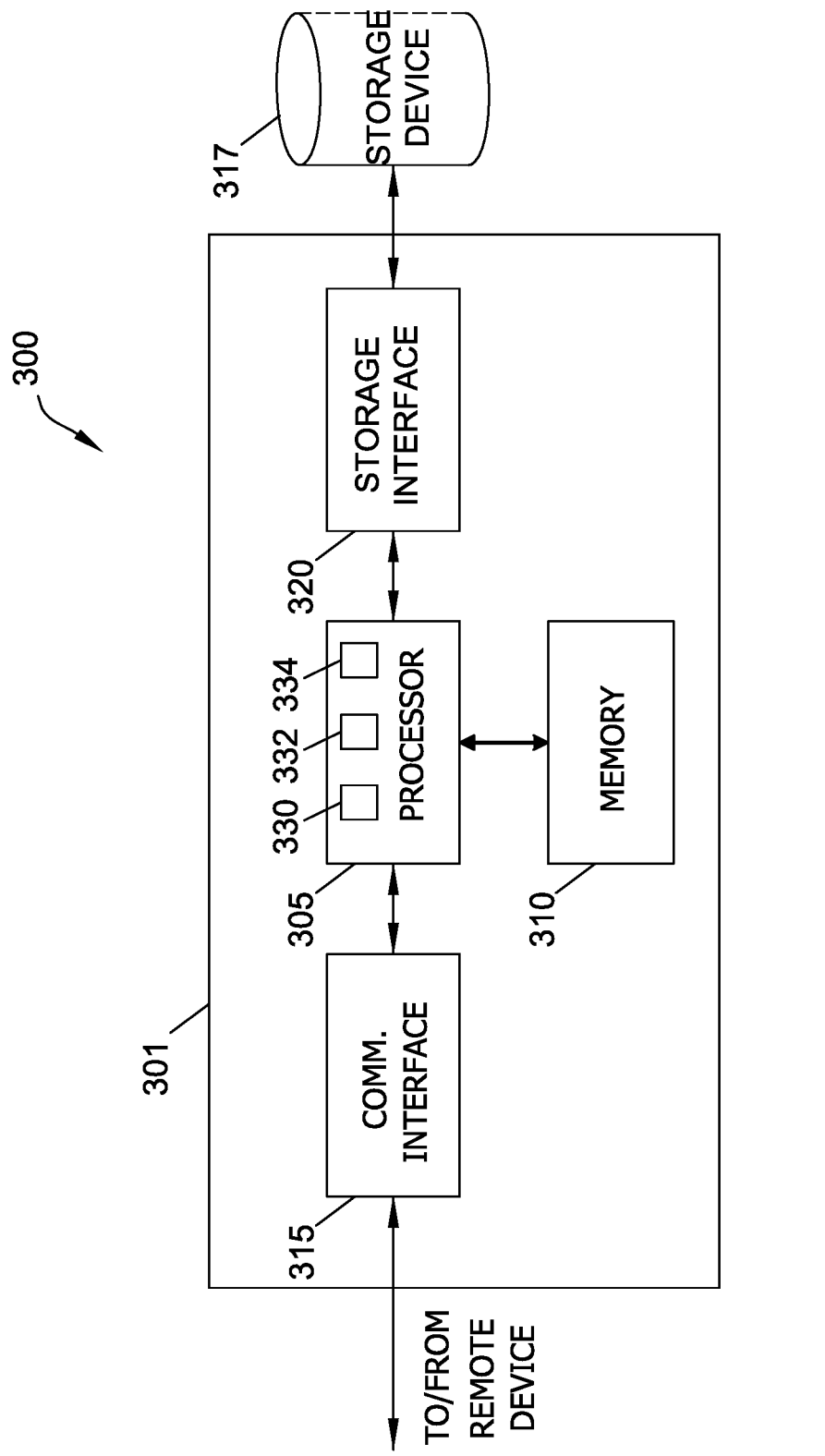
FIG. 3 depicts an exemplary server system that may be used with the computer system illustrated in FIG. 1.
Figure 4A:
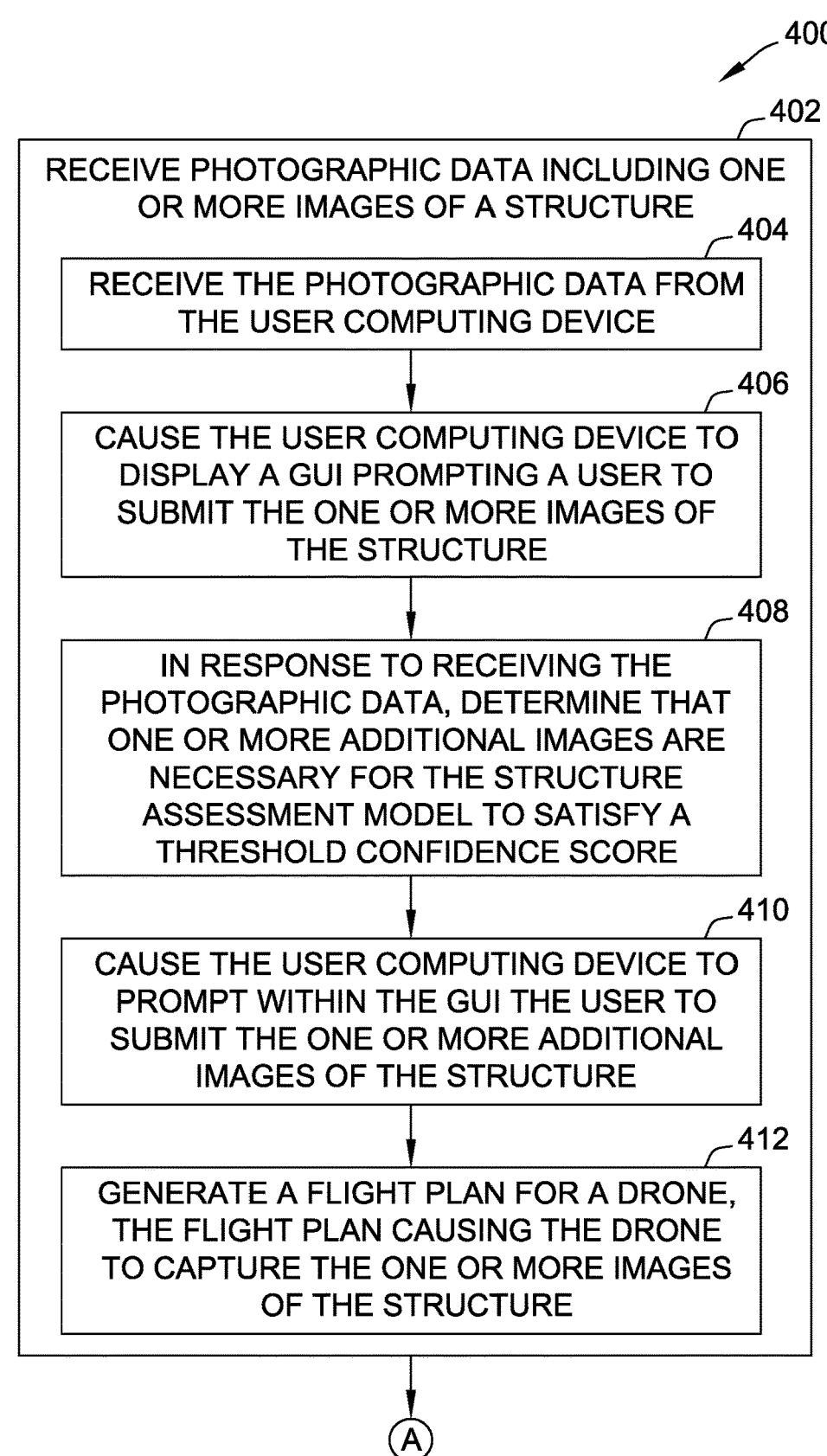
FIG. 4A depicts an exemplary computer-implemented method for analyzing images of structural damage using machine learning.
Figure 4B:
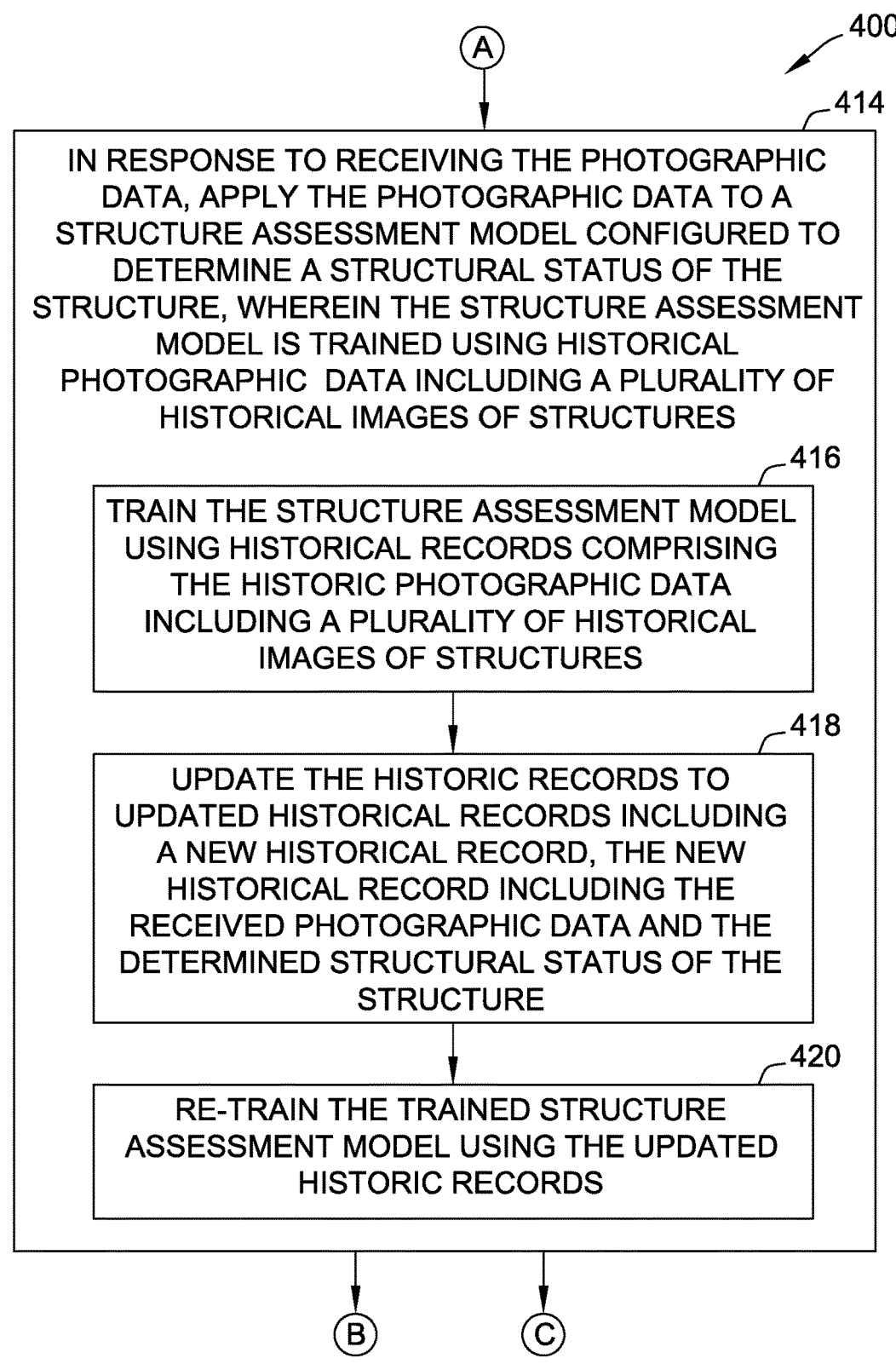
FIG. 4B is a continuation of the exemplary computer-implemented method shown in FIG. 4A.
Figure 4C:
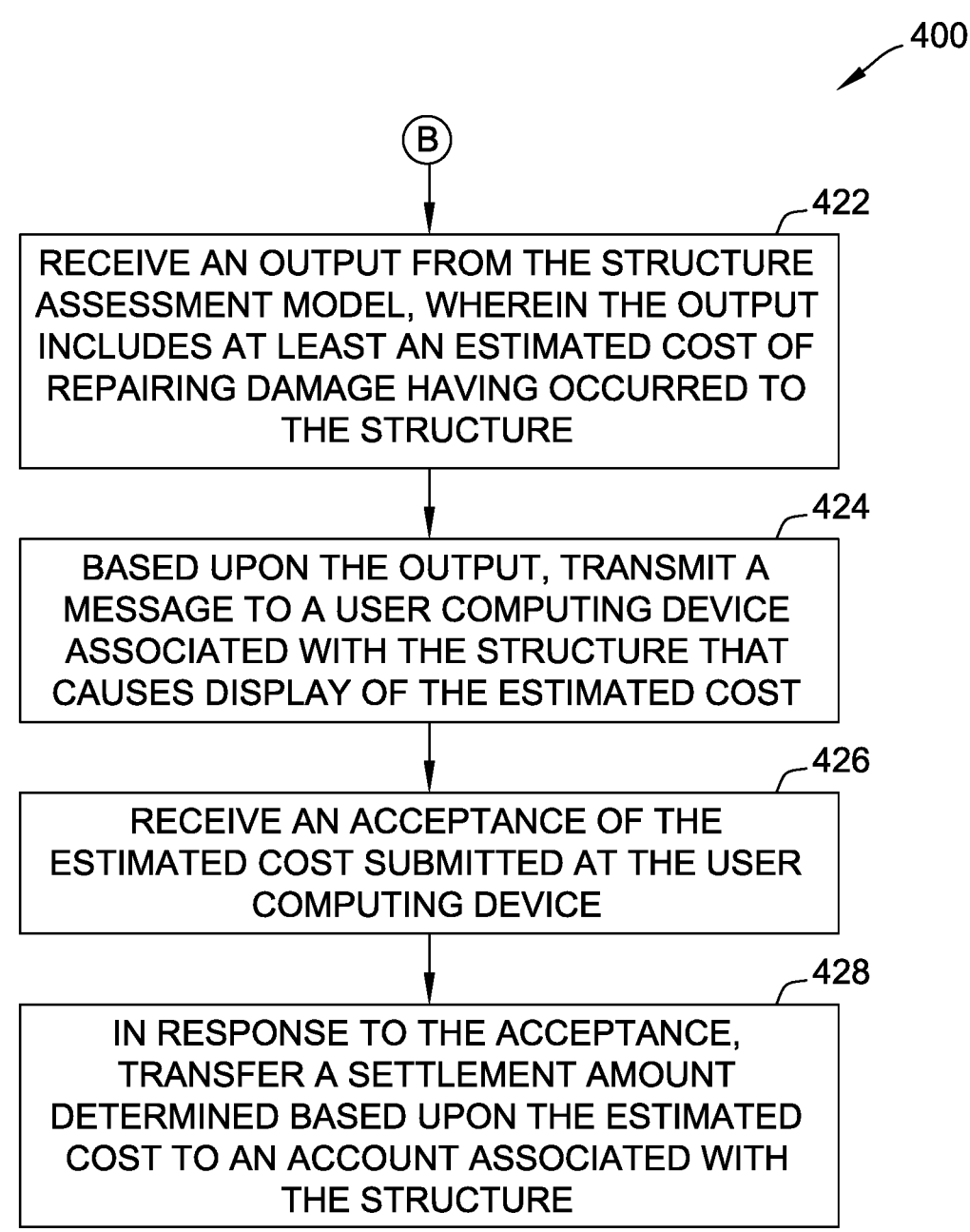
FIG. 4C is a continuation of the exemplary computer-implemented method shown in FIGS. 4A and 4B.

FIG. 3 depicts an exemplary server system that may be used with computer system 100 illustrated in FIG. 1. Server system 301 may be, for example, server computing device 102 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 may be operatively coupled to a communication interface 315 such that server system 301 is capable of communicating with user computing device 108 (all shown in FIG. 1), or another server system 301. For example, communication interface 315 may receive requests from occupant computing device 110, responder computing device 112, and/or headset 114 via the Internet. Further, processor 305, via communication interface 315, may be capable of causing funds to be transferred between various entities, such as, for example, an account associated with an insurer and an account associated with a policyholder, enabling payments to be made automatically if it is determined that the policyholder is eligible to receive a payment from the insurer.

Processor 305 may also be operatively coupled to a storage device 317, such as database 106 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317.

In other embodiments, storage device 317 may be external to server system 301 and may be accessed by a plurality of server systems 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

In exemplary embodiments, processor 305 may include and/or be communicatively coupled to one or more modules for implementing the systems and methods described herein. In some embodiments, processor 305 may include one or more of a communication module 330, an analytics module 332, and/or a funds transfer module 334.

In some embodiments, communications module 330 may be configured to orchestrate transmitting data to and receiving data from external devices such as, for example, user computing device 108 and/or other computing devices associated with, for example, insurers, financial institutions, data reporting entities (e.g., entities that may data relating to weather), and/or other entities. For example, communication module may be configured to receive photographic data including one or more images of a structure, transmit a message to the user computing device associated with the structure that causes display of an estimated cost, receive an acceptance of the estimated cost submitted at the user computing device, transmitting a message to the user computing device associated with the structure that causes display of an indicator that a parametric trigger event has been satisfied, and/or receiving an acceptance of a payout amount associated with the parametric trigger event submitted at the user computing device.

In some embodiments, analytics module 332 may be configured to make determinations based upon input data (e.g., collision data and/or telematics data), for example, by performing lookups and/or queries within databases (e.g., database 106), executing OCR and/or other algorithms, and/or by executing artificial intelligence (AI) and/or machine learning techniques as described above. For example, analytics module 332 may be configured to applying photographic data to a structure assessment model configured to determine a structural status of a structure, receive an output from the structure assessment model including at least an estimated cost of repairing damage having occurred to the structure, receive an output from the structure assessment model including at least a first value associated with a parametric trigger event, and/or determine, based upon the first value, that the parametric trigger event has been satisfied.

In some embodiments, funds transfer module 334 may be in communication with one or more financial institution computing devices, and may be configured to cause funds to be transferred from one financial account to another. For example, funds transfer module may be configured to transfer a settlement amount determined based upon an estimated cost to an account associated with a structure and/or transferring a payout amount (e.g., associated with a parametric insurance policy) to an account associated with a structure.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Method for Analyzing Images of Structural Damage Using Machine Learning FIGS. 4A, 4B, 4C, and 4D depict a flowchart illustrating an exemplary computer-implemented method 400 for analyzing images of structural damage using machine learning. Method 400 may be performed by a computer system such as computer system 100 (shown in FIG. 1).

Method 400 may include receiving 402 photographic data including one or more images of a structure. In some embodiments, receiving the photographic data may include receiving 404 the photographic data from a user computing device (such as user computer device 108). In such embodiments, receiving 402 the photographic data may further include causing 406 the user computing device to display a GUI prompting a user to submit the one or more images of the structure. In such embodiments, receiving the photographic data may further include. in response to receiving the photographic data, determining 408 that one or more additional images are necessary for the structure assessment model to satisfy a threshold confidence score and causing 410 the user computing device to prompt within the GUI the user to submit the one or more additional images of the structure. In some embodiments, receiving 402 photographic data may include generating 412 a flight plan for a drone, wherein the flight plan causes the drone to capture the one or more images of the structure. In some embodiments, receiving 402 the photographic data may be performed by server computing device 102, for example, by executing communication module 330 (shown in FIG. 3).

Method 400 may further include, in response to receiving the photographic data, applying 414 the photographic data to a structure assessment model configured to determine a structural status of the structure. The structure assessment model may be trained using historical photographic data including a plurality of historical images of structures. In some embodiments, applying 414 the photographic data to the structure assessment model may include training 416 the structure assessment model using historical records including the historical photographic data including a plurality of historical images of structures. In such embodiments, applying 414 the photographic data to the structure assessment model may further include updating 418 the historical records to updated historical records including a new historical record, wherein the new historical record includes the received photographic data and the determined structural status of the structure, and re-training 420 the trained structure assessment model using the updated historical records. In some embodiments, applying 414 the photographic data to the structure assessment model may be performed by server computing device 102, for example, by executing analytics module 332 (shown in FIG. 3).

Method 400 may further include receiving 422 an output from the structure assessment model. The output may include at least an estimated cost of repairing damage having occurred to the structure. In some embodiments, receiving 422 the output may be performed by server computing device 102, for example, by executing analytics module 332.

Method 400 may further include, based upon the output, transmitting 424 a message to the user computing device associated with the structure that causes display of the estimated cost. In some embodiments, transmitting 424 the message may be performed by server computing device 102, for example, by executing communication module 330.

In some embodiments, method 400 may further include receiving 426 an acceptance of the estimated cost submitted at the user computing device and, in response to the acceptance, transferring 428 a settlement amount determined based upon the estimated cost to an account associated with the structure. In some embodiments, receiving 426 the acceptance and transferring 428 the settlement amount may be performed by server computing device 102, for example, by executing communication module 330 and/or funds transfer module 334, respectively.

Method 400 may further include receiving 430 an output from the structure assessment model. The output may include includes at least a first value associated with a parametric trigger event. In some embodiments, receiving 430 the output may be performed by server computing device 102, for example, by executing analytics module 332.

Method 400 may further include determining 432, based upon the first value, that the parametric trigger event has been satisfied. In some embodiments, determining 432 that the parametric trigger event has been satisfied may be performed by server computing device 102, for example, by executing analytics module 332.

Method 400 may further include based upon the determination, transmitting 434 a message to the user computing device associated with the structure that causes display of an indicator that the parametric trigger event has been satisfied. some embodiments, transmitting 434 the message may be performed by server computing device 102, for example, by executing communication module 330.

In some embodiments, method 400 further includes receiving 436 an acceptance of a payout amount associated with the parametric trigger event submitted at the user computing device and, in response to the acceptance, transferring 438 the payout amount to an account associated with the structure. In some embodiments, receiving 436 the acceptance and transferring 438 the payout amount may be performed by server computing device 102, for example, by executing communication module 330 and/or funds transfer module 334, respectively.

In some embodiments, method 400 may include more or fewer steps than as shown in FIGS. 4A, 4B, 4C, and 4D. Furthermore, the steps of method 400 may not necessarily be performed in the order shown in FIGS. 4A, 4B, 4C, and 4D.

Exemplary Embodiments

In an exemplary embodiment, a computing device for analyzing structural damage images may be provided. The server computing device may include at least one memory and at least one processor in communication with the at least one memory. The at least one processor may be configured to receive photographic data including one or more images of a structure. The at least one processor may be further configured to, in response to receiving the photographic data, apply the photographic data to a structure assessment model configured to determine a structural status of the structure, wherein the structure assessment model is trained using historical photographic data including a plurality of historical images of structures. The at least one processor may be further configured to, receive an output from the structure assessment model, wherein the output includes at least an estimated cost of repairing damage having occurred to the structure. The at least one processor may be further configured to, based upon the output, transmit a message to a user computing device associated with the structure that causes display of the estimated cost. The server computing device may include additional, less, or alternate functionality, including that discussed elsewhere herein.

In another exemplary embodiment, a computer-implemented method for analyzing structural damage images may be provided. The computer-implemented method may be implemented via one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the method may be performed by a server computing device including at least one memory and at least one processor in communication with the at least one memory. The computer-implemented method may include (1) receiving, by the server computing device, photographic data including one or more images of a structure; (2) in response to receiving the photographic data, applying, by the server computing device, the photographic data to a structure assessment model configured to determine a structural status of the structure, wherein the structure assessment model is trained using historical photographic data including a plurality of historical images of structures; (3) receiving, by the server computing device, an output from the structure assessment model, wherein the output includes at least an estimated cost of repairing damage having occurred to the structure; and/or (4) based upon the output, transmitting, by the server computing device, a message to a user computing device associated with the structure that causes display of the estimated cost. The computer-implemented method may include additional, less, or alternate functionality, including that discussed elsewhere herein.

In another exemplary embodiment, at least one non-transitory computer-readable storage media having computer-executable instructions embodied thereon may be provided. When executed by a server computing device including at least one memory and at least one processor in communication with the at least one memory, the computer-executable instructions may cause the at least one processor to receive photographic data including one or more images of a structure. The computer-executable instructions may further cause the processor to, in response to receiving the photographic data, apply the photographic data to a structure assessment model configured to determine a structural status of the structure, wherein the structure assessment model is trained using historical photographic data including a plurality of historical images of structures. The computer-executable instructions may further cause the processor to receive an output from the structure assessment model, wherein the output includes at least an estimated cost of repairing damage having occurred to the structure. The computer-executable instructions may further cause the processor to, based upon the output, transmit a message to a user computing device associated with the structure that causes display of the estimated cost. The at least one non-transitory computer-readable storage media may include additional, less, or alternate functionality, including that discussed elsewhere herein.

In another exemplary embodiment, a computing device for analyzing structural damage images may be provided. The server computing device may include at least one memory and at least one processor in communication with the at least one memory. The at least one processor may be configured to receive photographic data including one or more images of a structure. The at least one processor may be further configured to, in response to receiving the photographic data, apply the photographic data to a structure assessment model configured to determine a structural status of the structure, wherein the structure assessment model is trained using historical photographic data including a plurality of historical images of structures. The at least one processor may be configured to receive photographic data including one or more images of a structure. The at least one processor may be further configured to receive an output from the structure assessment model, wherein the output includes at least a first value associated with a parametric trigger event. The at least one processor may be configured to receive photographic data including one or more images of a structure. The at least one processor may be further configured to determine, based upon the first value, that the parametric trigger event has been satisfied. The at least one processor may be configured to receive photographic data including one or more images of a structure. The at least one processor may be further configured to, based upon the determination, transmit a message to a user computing device associated with the structure that causes display of an indicator that the parametric trigger event has been satisfied. The server computing device may include additional, less, or alternate functionality, including that discussed elsewhere herein.

In another exemplary embodiment, a computer-implemented method for analyzing structural damage images may be provided. The computer-implemented method may be implemented via one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the method may be performed by a server computing device including at least one memory and at least one processor in communication with the at least one memory. The computer-implemented method may include (1) receiving, by the server computing device, photographic data including one or more images of a structure; (2) in response to receiving the photographic data, applying, by the server computing device, the photographic data to a structure assessment model configured to determine a structural status of the structure, wherein the structure assessment model is trained using historical photographic data including a plurality of historical images of structures; (3) receiving, by the server computing device, an output from the structure assessment model, wherein the output includes at least a first value associated with a parametric trigger event; (4) include determining, by the server computing device, based upon the first value, that the parametric trigger event has been satisfied; and/or (5) based upon the determination, transmitting, by the server computing device, a message to a user computing device associated with the structure that causes display of an indicator that the parametric trigger event has been satisfied. The computer-implemented method may include additional, less, or alternate functionality, including that discussed elsewhere herein.

In another exemplary embodiment, at least one non-transitory computer-readable storage media having computer-executable instructions embodied thereon may be provided. When executed by a server computing device including at least one memory and at least one processor in communication with the at least one memory, the computer-executable instructions may cause the at least one processor to receive photographic data including one or more images of a structure. The computer-executable instructions may further cause the at least one processor to, in response to receiving the photographic data, apply the photographic data to a structure assessment model configured to determine a structural status of the structure, wherein the structure assessment model is trained using historical photographic data including a plurality of historical images of structures. The computer-executable instructions may further cause the at least one processor to receive an output from the structure assessment model, wherein the output includes at least a first value associated with a parametric trigger event. The computer-executable instructions may further cause the at least one processor to determine, based upon the first value, that the parametric trigger event has been satisfied. The computer-executable instructions may further cause the at least one processor to, based upon the determination, transmit a message to a user computing device associated with the structure that causes display of an indicator that the parametric trigger event has been satisfied. The at least one non-transitory computer-readable storage media may include additional, less, or alternate functionality, including that discussed elsewhere herein.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, server computing device 102 is configured to implement machine learning, such that server computing device 102 "learns" to analyze, organize, and/or process data without being explicitly programmed. Machine learning may be implemented through machine learning ("ML") methods and algorithms ("ML methods and algorithms"). In one exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to photographic data including historical photographic data, structural data including historical structural data, damage data including historical damage data, data retrieved from other sources (e.g., weather and/or location data), and/or user input received from, for example, user computing device 108. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of data with known characteristics or features.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for analyzing images using machine learning tools to identify and categorize changes in a state of a structure, the computing device comprising at least one memory and at least one processor in communication with the at least one memory, the at least one processor configured to:

train, via machine learning, a structure assessment model using historical records including (i) historical photographic data including a plurality of historical images of structures, and (ii) one or more historical values associated with each of the plurality of historical images of structures, the one or more historical values associated with one or more parametric trigger events, the trained structure assessment model configured to output one or more values associated with the one or more parametric trigger events based upon an input of photographic data;

receive photographic data including one or more images of a structure;

in response to receiving the photographic data, input the photographic data into the trained structure assessment model;

receive an output from the structure assessment model generated based upon the input of the photographic data, wherein the output comprises at least a first value associated with a parametric trigger event of the one or more parametric trigger events;

determine, based upon the first value, that the parametric trigger event has been satisfied; and based upon the determination, transmit a message to a user computing device associated with the structure that causes display of an indicator that the parametric trigger event has been satisfied.

2. The computing device of claim 1, wherein the at least one processor is further programmed to receive the photographic data from the user computing device.

3. The computing device of claim 2, wherein the at least one processor is further configured to cause the user computing device to display a graphical user interface (GUI) prompting a user to submit the one or more images of the structure.

4. The computing device of claim 3, wherein the at least one processor is further configured to:

in response to receiving the photographic data, determine that one or more additional images are necessary for the structure assessment model to satisfy a threshold confidence score; and cause the user computing device to prompt within the GUI the user to submit the one or more additional images of the structure.

5. The computing device of claim 1, wherein the at least one processor is further configured to:

update the historical records to updated historical records comprising a new historical record, the new historical record comprising the received photographic data and the determined first value associated with the structure; and re-train the trained structure assessment model using the updated historical records.

6. The computing device of claim 1, wherein the historical records further include historical structural data associated with the plurality of historical images.

7. The computing device of claim 6, wherein the historical structural data includes at least one of the following: roof material, roof age, shingle type, roof slant angle, age of roof, total area of a roof, and roof occlusion.

8. The computing device of claim 1, wherein the processor is further configured to:

receive an acceptance of a payout amount associated with the parametric trigger event submitted at the user computing device; and in response to the acceptance, transfer the payout amount to an account associated with the structure.

9. The computing device of claim 1, wherein the processor is further configured to generate a flight plan for a drone, the flight plan causing the drone to capture the one or more images of the structure.

10. A computer-implemented method for analyzing images using machine learning tools to identify and categorize changes in a state of a structure, the computer-implemented method performed by a server computing device including at least one memory and at least one processor in communication with the at least one memory, the computer-implemented method comprising:

training, via machine learning by the server computing device, a structure assessment model using historical records including (i) historical photographic data including a plurality of historical images of structures, and (ii) one or more historical values associated with each of the plurality of historical images of structures, the one or more historical values associated with one or more parametric trigger events, the trained structure assessment model configured to output one or more values associated with the one or more parametric trigger events based upon an input of photographic data;

receiving, by the server computing device, photographic data including one or more images of a structure;

in response to receiving the photographic data, inputting, by the server computing device, the photographic data into the trained structure assessment model;

receiving, by the server computing device, an output from the structure assessment model generated based upon the input of the photographic data, wherein the output comprises at least a first value associated with a parametric trigger event of the one or more parametric trigger events;

determining, by the server computing device, based upon the first value, that the parametric trigger event has been satisfied; and based upon the determination, transmitting, by the server computing device, a message to a user computing device associated with the structure that causes display of an indicator that the parametric trigger event has been satisfied.

11. The computer-implemented method of claim 10, further comprising receiving, by the server computing device, the photographic data from the user computing device.

12. The computer-implemented method of claim 11, further comprising causing, by the server computing device, the user computing device to display a graphical user interface (GUI) prompting a user to submit the one or more images of the structure.

13. The computer-implemented method of claim 12, further comprising:

in response to receiving the photographic data, determining, by the server computing device, that one or more additional images are necessary for the structure assessment model to satisfy a threshold confidence score; and causing, by the server computing device, the user computing device to prompt within the GUI the user to submit the one or more additional images of the structure.

14. The computer-implemented method of claim 10, further comprising:

updating, by the server computing device the historical records to updated historical records comprising a new historical record, the new historical record comprising the received photographic data and the determined first value associated with the structure; and re-training, by the server computing device, the structure assessment model using the updated historical records.

15. The computer-implemented method of claim 10, wherein the historical records further include historical structural data associated with the plurality of historical images.

16. The computer-implemented method claim 15, wherein the historical structural data includes at least one of the following: roof material, roof age, shingle type, roof slant angle, age of roof, total area of a roof, and roof occlusion.

17. The computer-implemented method of claim 10, further comprising:

receiving, by the server computing device, an acceptance of a payout amount associated with the parametric trigger event submitted at the user computing device; and in response to the acceptance, transfer the payout amount to an account associated with the structure.

18. The computer-implemented method of claim 10, further comprising generating, by the server computing device, a flight plan for a drone, the flight plan causing the drone to capture the one or more images of the structure.

19. At least one non-transitory computer-readable storage media having computer-executable instructions embodied thereon for analyzing images using machine learning tools to identify and categorize changes in a state of a structure, wherein when executed by a server computing device including at least one memory and at least one processor in communication with the at least one memory, the computer-executable instructions cause the at least one processor to:

train, via machine learning, a structure assessment model using historical records including (i) historical photographic data including a plurality of historical images of structures, and (ii) one or more historical values associated with each of the plurality of historical images of structures, the one or more historical values associated with one or more parametric trigger events, the trained structure assessment model configured to output one or more values associated with the one or more parametric trigger events based upon an input of photographic data;

receive photographic data including one or more images of a structure;

in response to receiving the photographic data, input the photographic data into the trained structure assessment model;

receive an output from the structure assessment model generated based upon the input of the photographic data, wherein the output comprises at least a first value associated with a parametric trigger event of the one or more parametric trigger events;

determine, based upon the first value, that the parametric trigger event has been satisfied; and based upon the determination, transmit a message to a user computing device associated with the structure that causes display of an indicator that the parametric trigger event has been satisfied.

\* \* \* \* \*